United States Patent
Kreymerman

(10) Patent No.: US 6,356,379 B1
(45) Date of Patent: Mar. 12, 2002

(54) ADJUSTABLE OPTO-ACOUSTICAL LOW PASS FILTER AND TECHNIQUE

(75) Inventor: Grigoriy Kreymerman, Pembroke Pines, FL (US)

(73) Assignee: Florida Atlantic University, Boca Raton, FL (US)

( * ) Notice: Subject to any disclaimer, the term of this patent is extended or adjusted under 35 U.S.C. 154(b) by 0 days.

(21) Appl. No.: 09/455,884

(22) Filed: Dec. 6, 1999

Related U.S. Application Data

(60) Provisional application No. 60/111,343, filed on Dec. 7, 1998.

(51) Int. Cl.[7] .................................................. G02F 1/33
(52) U.S. Cl. ..................... 359/305; 359/308; 359/311
(58) Field of Search ................................. 359/291, 292, 359/297, 298, 305, 311, 312, 308, 313, 285; 348/335, 340, 342, 343

(56) References Cited

U.S. PATENT DOCUMENTS

| | | | |
|---|---|---|---|
| 4,795,236 A | 1/1989 | Ise | 350/162.2 |
| 4,878,737 A | 11/1989 | Ise | 350/167 |
| 4,999,510 A * | 3/1991 | Hayano | 250/271 |
| 5,083,856 A * | 1/1992 | Hatori et al. | 385/7 |
| 5,091,795 A | 2/1992 | Nishioka et al. | 359/93 |
| 5,237,452 A | 8/1993 | Okayama et al. | 359/574 |
| 5,426,980 A * | 6/1995 | Smith | 73/644 |
| 5,471,344 A | 11/1995 | Sugawara | 359/566 |
| 5,477,381 A | 12/1995 | Sasaki et al. | 359/497 |
| 5,504,621 A | 4/1996 | Okayama et al. | 359/569 |
| 5,550,663 A | 8/1996 | Nishizaki et al. | 359/95 |
| 5,568,197 A | 10/1996 | Hamano | 348/342 |
| 5,581,301 A | 12/1996 | Ninomiya | 348/342 |
| 5,589,882 A | 12/1996 | Shiraishi et al. | 348/340 |
| 5,652,809 A * | 7/1997 | Aronson | 385/7 |
| 5,818,592 A * | 10/1998 | Womack | 356/357 |
| 5,890,789 A * | 4/1999 | Inagaki | 359/305 |

FOREIGN PATENT DOCUMENTS

WO    WO98/16068    4/1998

* cited by examiner

Primary Examiner—Georgia Epps
Assistant Examiner—Tuyen Tra
(74) Attorney, Agent, or Firm—Martin Novack

(57) ABSTRACT

Apparatus for receiving light containing image-representative information, and low-pass filtering the light. A pellicle is positioned in the path of the light. At least one transducer is coupled with the pellicle and an AC electrical signal is applied to the transducer to establish waves in the pellicle. The waves are operative to low-pass filter the image-representative information in light reflected from the pellicle.

20 Claims, 7 Drawing Sheets

ADJUSTABLE OPTO-ACOUSTICAL LOW PASS FILTER AND TECHNIQUE

RELATED APPLICATION

The present application claims priority from U.S. Provisional Patent Application No. 60/111,343 filed Dec. 7, 1998, and said Provisional Patent Application is incorporated herein by reference.

FIELD OF THE INVENTION

This invention relates to the filtering of light containing image-representative information and, more particularly, to an adjustable opto-acoustical low pass filter and technique.

BACKGROUND OF THE INVENTION

When a solid state sensor, for example in a video camera or a still image digital camera, senses images containing spatial frequencies beyond the Nyquist limit, the electronic video signals from the solid state sensor may produce a displayed picture containing artifacts such as aliasing, moire patterns, and phantom color patterns. An optical low pass filter can be used to suppress high frequency components of the image received by the sensor. However, existing approaches to low pass optical filtering have various disadvantages.

One type of conventional optical low-pass filter is based on birefringent crystal plates. A disadvantage of this type of filter is the requirement for a precise orientation axis of the stacked birefringent crystal plates, making it unsuitable for mass production. Also the number of crystal plates in this design increases the overall length of the optical system. The stack of crystal plates requires a large optical path to separate a passing ray on two or more exiting rays. Another disadvantage of this type of filter is the high cost of the crystal raw material. Still another disadvantage of the birefringent filter is that it depends on the configuration and pitch of the pixels. The birefringent filter is inflexible in that it can be used only with a certain type of solid state sensor.

Another commonly used filter is a phase noise type of optical low-pass filter, which has a periodic structure of phase diffraction grating that can be two dimensional. This filter is thinner than the birefringent filter. The diffraction grating structure depends on the pixel structure. The position of this type of filter relates to the pitch of the diffraction grating and the pitch of the pixels in the solid state sensor. The optical characteristics of the diffraction grating low pass filter are low in quality as compared with the birefringent filter but are significantly less expensive.

It is among the objects of the present invention to provide an improved optical low pass filter and technique that overcomes problems and limitations of prior art approaches.

SUMMARY OF THE INVENTION

The present invention is directed to an optical low pass filter and technique that provides excellent performance in conjunction with simplicity and low cost. The filter of the invention has the advantage of flexibility; that is, it can be used with any solid state sensor. Also, the filter is adjustable.

In accordance with an embodiment of the invention, there is disclosed an apparatus for receiving light containing image-representative information, and low-pass filtering said light, the apparatus comprising: a pellicle positionable in the path of said light; at least one transducer coupled with the pellicle; and means for applying an AC electrical signal to the transducer to establish waves in the pellicle; whereby said waves are operative to low-pass filter the image-representative information in light reflected from the pellicle.

In a preferred embodiment of the invention, the waves are ultrasonic waves and the pellicle is a plastic sheet. The pellicle can alternatively be a thin glass sheet.

In a described embodiment, the light is also transmitted through the pellicle, and the pellicle is thin enough to avoid low-pass filtering of the image-representative information in the portion of the light transmitted through the pellicle.

Further features and advantages of the invention will become more readily apparent from the following detailed description when taken in conjunction with the accompanying drawings.

BRIEF DESCRIPTION OF THE DRAWINGS

FIG. 4, which includes

DETAILED DESCRIPTION

Figure 1:
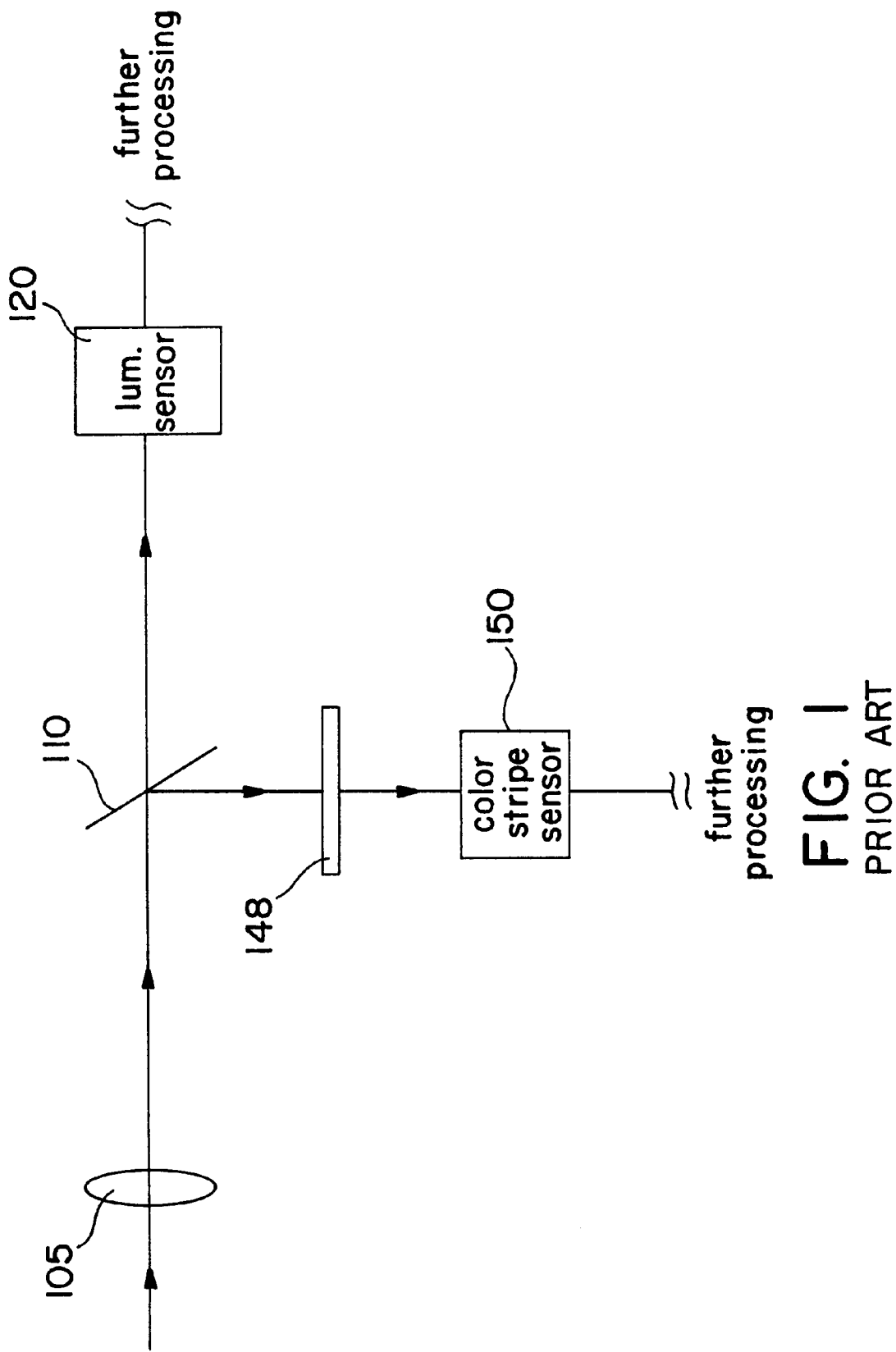
FIG. 1 is a block diagram of a portion of a camera system in which the invention can be utilized.

FIG. 1 shows part of a camera system of the general type set forth in Published PCT Application WO 98/160068, which can produce a high definition video signal, and which can be advantageously modified to employ an optical low pass filter of the present invention. It will be understood that this application of the invention is illustrative and non-limiting. In the FIG. 1 example, light received from a scene being viewed is focused by a camera lens system, represented at 105, through a splitter, e.g. a half-silvered mirror 110, onto CCD image sensors 120 and 150, respectively. The image sensor 120 is used as a luminance sensor, and the image sensor 150 is provided with color stripes and is operated as a color sensor. As described in the referenced Published PCT Application, the image sensors 120 and 150 can be operated at different rates. The outputs of the image sensors 120 and 150 are coupled to respective processing circuitry (not shown), and can be ultimately combined and utilized to produce output progressive and/or interlaced scanned high definition video signals. In a prior art version of FIG. 1, an optical low-pass spatial filter, represented at 148 (and which could be of a type described in the Background portion hereof) could be interposed before the image sensor 150 to prevent alias frequencies from being generated by low spatial frequency sampling in the color channel of the camera system.

Figure 2:
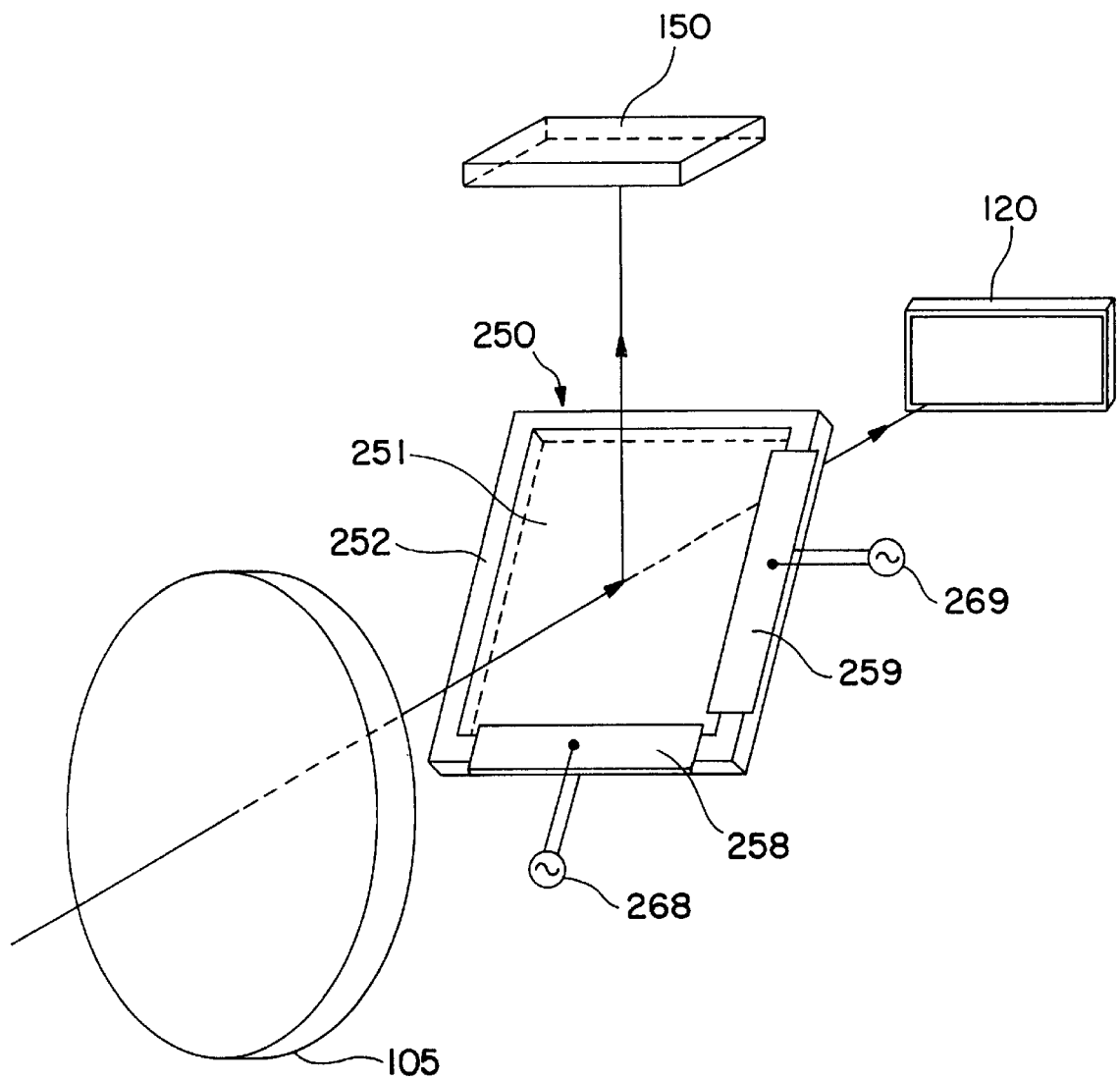
FIG. 2 is a diagram of an embodiment of an optical low pass filter in accordance with an embodiment of the invention, as employed in a camera system.
Figure 3:
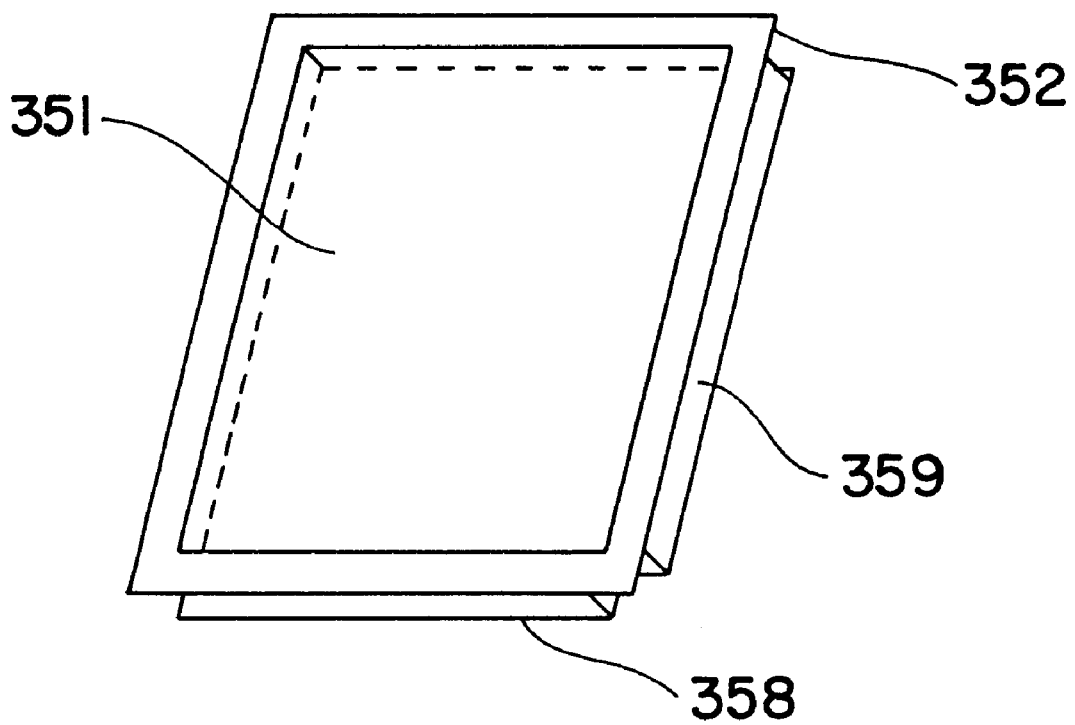
FIG. 3 is a diagram of a further embodiment of an optical low pass filter in accordance with the invention.
Figure 4A:
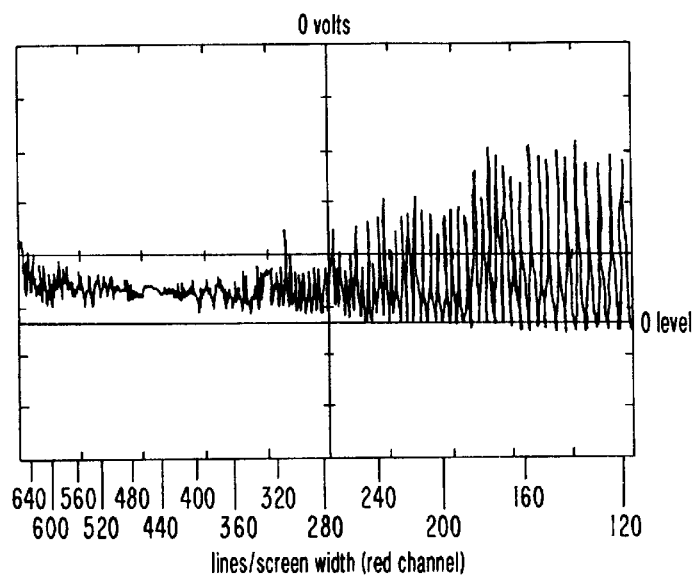
FIGS. 4A, 4B, 4C, 4D and 4E, shows oscillograms of a video line signal in a color (red) channel of a standard burst resolution chart at 30 kHz and at respectively different amplitudes of 0 volts, 5 volts, 7.5 volts, 10 volts, and 15 volts.
Figure 4B:
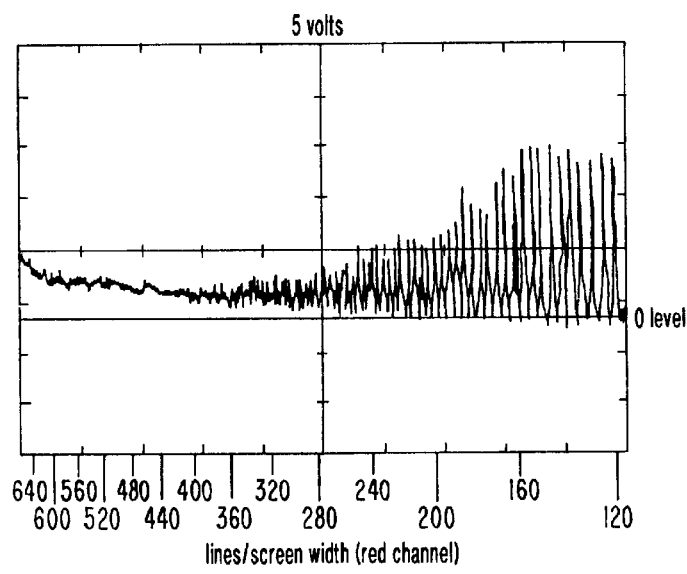
Figure 4C:
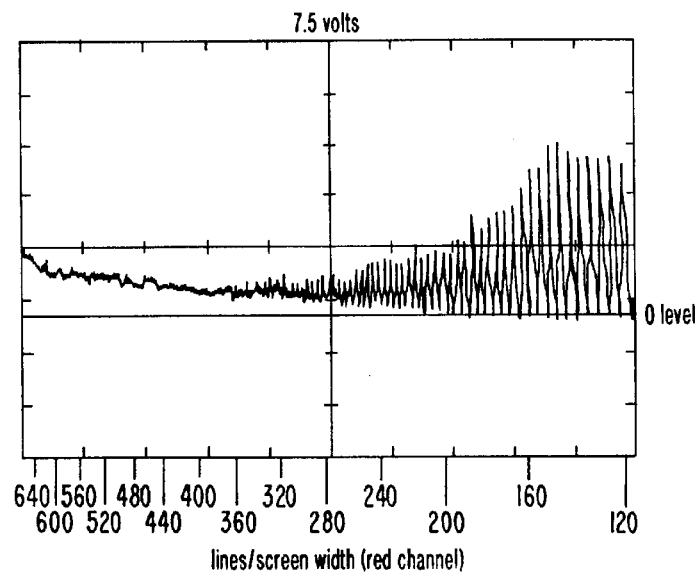
Figure 4D:
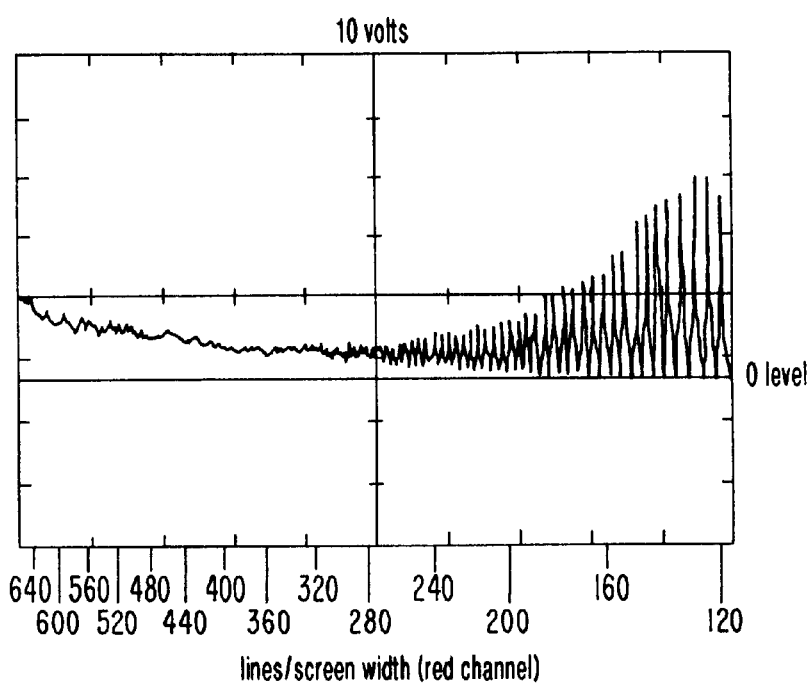
Figure 4E:
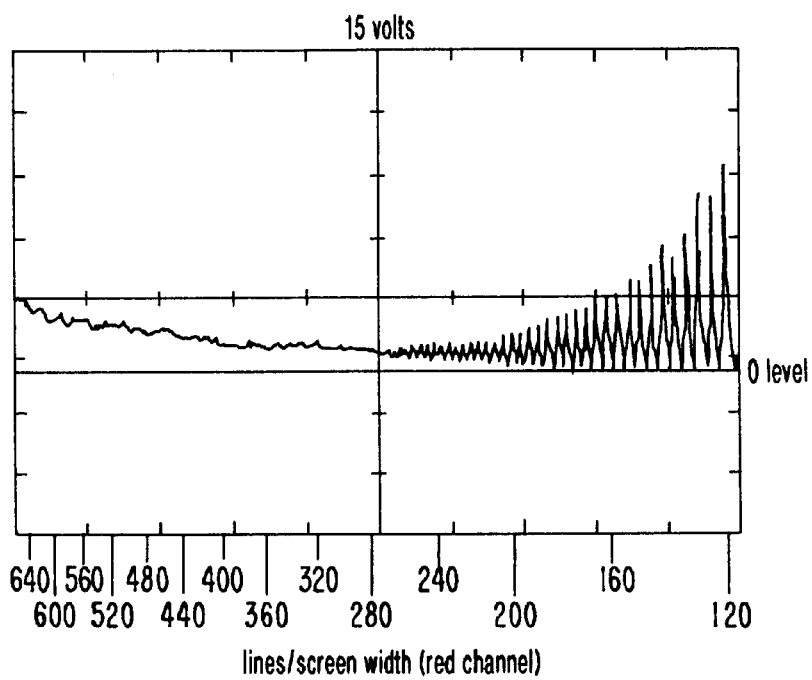

An example which illustrates an optical low-pass spatial filter in accordance with an embodiment of the invention, employed in the FIG. 1 type of system, is shown in FIG. 2, which again shows a representative optical ray, optics (lens) 105, luminance image sensor 120 and color image sensor 150. The adjustable optical low-pass filter 250 allows a gradual change in the Modulation Transfer Function (MTF) with respect to the high spatial frequencies of the image. The present invention is based on an excitation acoustic wave in a high tensile strength elastic membrane of the pellicle beamsplitter or mirror. For example, in FIG. 2 the low pass filter 250 includes a pellicle beamsplitter 251 that splits a light beam after the lens 105 onto the image sensors 120, 150. The beam reflected from pellicle membrane 251 is incident on the color sensor 150 in the focal plane of the lens. The beam transmitted through the pellicle membrane 251 is incident on the monochrome sensor 120 in the focal plane of the lens. The pellicle membrane 251 is mounted on a frame 252. The source of acoustic waves in this embodiment is piezo-ceramic transducers 258 and 259 which attach to the surface of the rectangular pellicle membrane from one side or two orthogonal sides to obtain a more uniform acoustical field on the membrane surface. The piezo-ceramic transducers can be applied to the frame 252 as piezo-ceramic stripes. In an embodiment illustrated in FIG. 3, the piezo-ceramic transducers can be built in the frame of the pellicle beamsplitter, where there are piezo-ceramic stripes 358 and 359, orthogonally oriented, glued to a metal shim frame 352, the pellicle 351 being stretches on the frame. AC sources 268 and 269 are respectively coupled with transducers 258 and 259 which excite acoustic harmonics in the pellicle membrane which create a uniform distortion of the surface.

Figure 5:
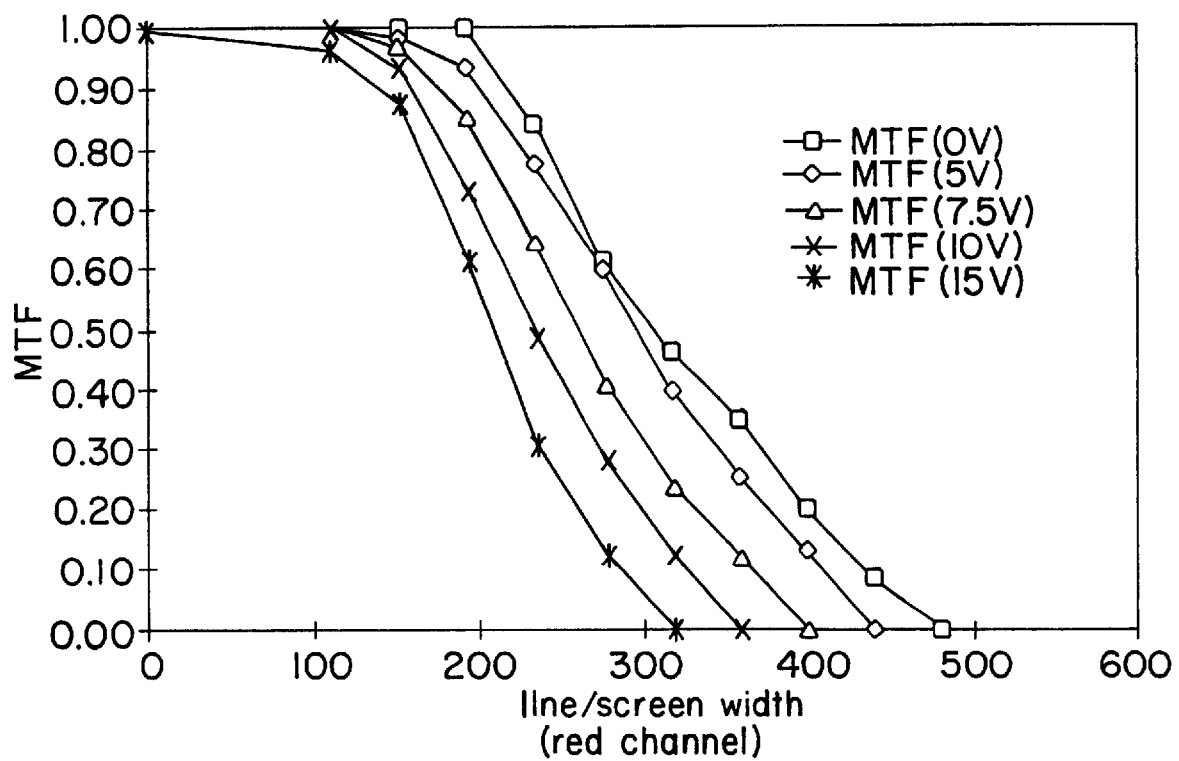
FIG. 5 is a graph showing Modulation Transfer Function (MTF) as a function of line/screen width for each of the different amplitudes of FIG. 4.

The pellicle membrane surface distortion changes the MTF of the optical path only in the reflecting channel without changing the optical parameters of the light beam transmitted through the membrane because of the thinness of the membrane (e.g. about 2 microns). The cutoff of the high spatial frequency may change gradually by changing the amplitude of the acoustic wave (as illustrated in FIG. 4), that reflects the gradual change of the MTF optical system. FIG. 4, which includes FIGS. 4A, 4B, 4C, 4D and 4E, shows oscillograms of a video line signal in a color (red) channel of a standard burst resolution chart at 30 kHz and at respectively different amplitudes of 0 volts, 5 volts, 7.5 volts, 10 volts, and 15 volts. FIG. 4 shows that by applying 5 volts amplitude of periodic signal to just one of the piezo transducers will suppress moire which is present on an oscillogram at 0 volts in an interval from 460 to 680 lines/screen width. Also, the oscillograms in FIG. 4 demonstrate a significant reduction of aliasing noise (see envelopes of signal), beginning at 5 volts and following discrimination noise at 7.5, 10, and 15 volts. The filter reduces cutoff spatial frequency of MTF (see FIG. 5) in the reflected beam channel by increasing the amplitude of the acoustic signal. In other words, the present invention allows adjusting the MTF of the camera's optical system to suppress aliasing, moire and phantom color whenever a high spatial frequency of periodic structure is present, without significantly reducing the resolution of camera. In the present invention, the source of acoustic waves may be turned off or acoustic signals can be reduced to a minimum to support the highest camera resolution when periodic structure or aliasing is absent. The present invention does not depend on configuration and size of the pixels. This filter creates uniform adjustable phase noise in the face plane of the sensor and suppresses the high spatial frequencies of the image.

Figure 6:
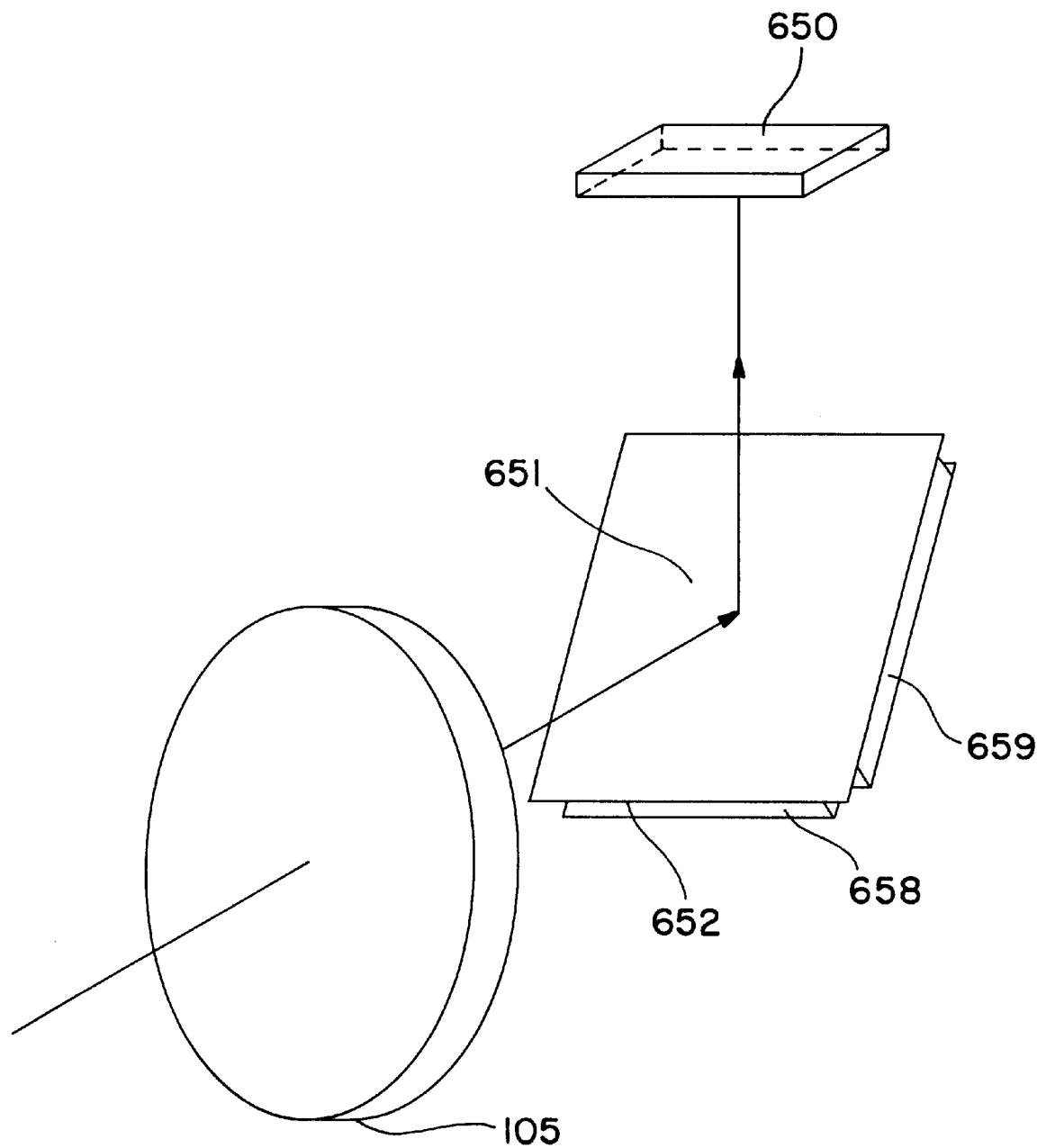
FIG. 6 is a diagram of an embodiment of an optical low pass filter in accordance with an embodiment of the invention, as employed in a camera system with a single solid state sensor.

The present invention can be used in color video cameras with a single solid state sensor (650 in FIG. 6), in still image digital color cameras, and in other applications. As shown in FIG. 6, a pellicle mirror 651 with piezo-piezo ceramic transducers 658, 659 attached to a metal shim frame 652 can be used instead of a pellicle beamsplitter.

In summary, the low pass optical filter and technique of the invention improves over predecessors in respect to the high quality of the optical parameters, the relative simplicity and low cost, the ability to gradually adjust MTF according to image, and the accommodation of existing components (pellicle beamsplitter or mirror) of the camera optical system without occupying additional space and without changing length of the optical path.

What is claimed is:

1. Apparatus for receiving light containing image-representative information, and low-pass filtering said light, comprising:
    a pellicle positionable in the path of said light;
    at least one transducer coupled with said pellicle;
    means for applying an AC electrical signal to said transducer to establish waves in said pellicle;
    whereby said waves are operative to low-pass filter the image-representative information in light reflected from said pellicle.

2. Apparatus as defined by claim 1, wherein said pellicle is plastic.

3. Apparatus as defined by claim 2, wherein said pellicle is a pellicle beamsplitter and said light is also transmitted through said pellicle, and said pellicle is thin enough to avoid low-pass filtering of the image-representative information in the portion of the light transmitted through said pellicle.

4. Apparatus as defined by claim 1, wherein said pellicle is glass.

5. Apparatus as defined by claim 1, wherein said waves are acoustic waves.

6. Apparatus as defined by claim 5, wherein said acoustic waves are ultrasonic waves.

7. Apparatus as defined by claim 1, wherein said pellicle is a pellicle beamsplitter and said light is also transmitted through said pellicle, and said pellicle is thin enough to avoid low-pass filtering of the image-representative information in the portion of the light transmitted through said pellicle.

8. Apparatus as defined by claim 1, wherein said pellicle is a pellicle mirror.

9. Apparatus as defined by claim 1, wherein said at least one transducer comprises a plurality of transducers.

10. Apparatus as defined by claim 1, wherein said plurality of transducers includes first and second elongated orthogonally oriented transducers.

11. Apparatus as defined by claim 10, wherein said pellicle is mounted in a frame, and said transducers are coupled with said frame.

12. A method for low-pass spatially filtering light containing an image, comprising the steps of:
    providing a pellicle in the path of said light;
    applying electrical signals to at least one transducer on said pellicle to establish waves in said pellicle;
    whereby said waves are operative to low-pass spatially filter light reflected from said pellicle.

13. The method as defined by claim 12, further comprising the step of changing the applied electrical signals to adjust the characteristics of the low pass filtering of said light reflected from the pellicle.

14. The method as defined by claim 12, wherein said step of providing a pellicle comprises providing a plastic pellicle.

15. The method as defined by claim 12, wherein said step of providing a pellicle comprises providing a glass pellicle.

16. The method as defined by claim 12, wherein said step of providing a pellicle comprises providing a pellicle that is thin enough to avoid low-pass filtering of the image-representative information in the portion of the light transmitted through said pellicle.

17. The method as defined by claim 12, wherein said step of applying electrical signals to said at least one transducer to establish waves in said pellicle comprises applying said electrical signals to establish ultrasonic waves in said pellicle.

18. The method as defined by claim 17, wherein said step of applying electrical signals to said at least one transducer on said pellicle comprises applying said signals to a plurality of transducers on said pellicle.

19. An optical low-pass filter, comprising:

a rectangular frame;

a plastic pellicle mounted in said frame;

first and second elongated transducers mounted on adjacent legs of said rectangular frame; and means for applying AC electrical signals to said transducers.

20. The optical low-pass filter as defined by claim 19, wherein said means for applying AC electrical signals to said transducers is operative to establish ultrasonic waves in said pellicle.

\* \* \* \* \*